United States Patent

[11] 3,571,793

[72] Inventor Ronald H. Britt
Ilford, England
[21] Appl. No. 752,837
[22] Filed Aug. 15, 1968
[45] Patented Mar. 23, 1971
[73] Assignee The Plessey Company Limited
Ilford, England
[32] Priority Aug. 16, 1967
[33] Great Britain
[31] 37757/67

[54] CHARACTER RECOGNITION SYSTEMS
3 Claims, 3 Drawing Figs.

[52] U.S. Cl. .......... 340/146.3
[51] Int. Cl. .......... G06k 9/13
[50] Field of Search .......... 340/146.3

[56] References Cited
UNITED STATES PATENTS

| | | | |
|---|---|---|---|
| 3,104,372 | 9/1963 | Rabinow et al. | 340/146.3 |
| 3,114,131 | 12/1963 | Furr et al. | 340/146.3 |
| 3,166,743 | 1/1965 | Greenwald | 340/146.3 |
| 3,246,293 | 4/1966 | Shelton, Jr. | 340/146.3 |
| 3,415,950 | 12/1968 | Bartz et al. | 340/146.3 |

*Primary Examiner*—Daryl W. Cook
*Assistant Examiner*—William W. Cochran
*Attorney*—Sorivener, Parker, Scrivener and Clarke

ABSTRACT: An E13B character recognition system comprising a read head beneath which a character to be recognized is passed to produce a digital signal which is stored in a shift register the content of which is compared in recognition gates for correspondence with a particular character in dependence upon which the gates are set, and in the presence of such correspondence a recognition signal is delivered, sufficient information being available in the shift register also to provide an indication of the print quality of any character to be recognized.

CHARACTER RECOGNITION SYSTEMS

This invention relates to systems for the recognition of printed characters and more particularly but not exclusively it relates to systems for the recognition of magnetic imprinted characters. "It is an object of the present invention to provide a digital system for the recognition of printed characters which provides an indication of print quality."

According to the present invention a character recognition system for recognizing printed characters comprises a read head, means for producing relative movement between said head and a printed character to provide an AC output signal characteristic of the character, amplifier/clipper means to which said AC output signal is applied to produce a corresponding three level digital signal including positive and negative pulses corresponding to positive and negative peaks in the AC output signal, two shift registers through which said digital signal is stepped positive pulses to one of said two registers and negative pulses to the other of said two shift registers, gating means operatively associated with said two shift registers and responsive to the absence of the signals in corresponding stages of said two shift registers for registering a zero signal level state obtaining in said digital signal, recognition gates operatively associated with the gating means and the two shift registers for sampling the signal stored therein and providing an appropriate output signal when correspondence obtains between the stored signals and signals characteristic of a printed character represented by the state of said recognition gates, recognition gate selector means operative for setting sequentially the recognition gates in accordance with different combinations of signal elements, each combination being representative (in respect of the character to be recognized) of a different print quality, and coincidence gate means responsive, to signals indicative of the recognized character and to signals characteristic of the particular signal combination utilized in respect of that character, for providing an output signal indicative of print quality in respect of a recognized character."

One aspect of the invention consists in a method of recognizing E13B characters which comprises causing adjacent strips of each character to produce consecutively an electric or magnetic flux of a magnitude varying in accordance with the printed area in each strip, producing from this flux electric pulses representative in magnitude and sign of the variation of said flux at the limits of the individual strips, and recognizing the character by the coincidence of the polarity of the pulse thus obtained, or the absence of such pulse of a given polarity, in each of a number of reference positions, with the presence of the pulse of this polarity above a predetermined level or the absence of the such pulse, or of any pulse, that would occur at the corresponding position in a signal similarly produced by an ideal character.

The system, according to a more specific aspect of the present invention, may be utilized in an arrangement for checking, by recognition, E13B characters printed in magnetic ink and utilized for recognizing a serial number, an account number and a branch number, for example on bank checks E13B characters are in common use and an important feature of the present invention resides in the fact that it has been recognized that if a digital signal comprising positive or negative pulses is produced by means as aforesaid and in addition to the absence of a positive and a negative pulse is assumed to be indicative of a zero or no-output condition, there is sufficient information available in the digital signal representative of any E13B character not only to differentiate between that character and any other character but also to assess the quality of the characters as regards print reproduction. This identification and/or quality assessment is achieved by means whereby the combination of signal elements required for recognition is not only changed for different characters but whereby for each character signal-element combinations may be presented to the comparator in any one of a number of different forms each of which depends for recognition upon a different degree of quality of print reproduction. The comparator may thus execute an operational sequence of comparisons for each stored digital signal whereby the said signal is successively sampled to determine the presence or absence of a number of predetermined signal-element combinations each representative of a different acceptance quality of print reproduction and the recognition means may be arranged to provide a character recognition signal and an output indicative of print quality in accordance with the presence or absence of one or more of the signal-element combinations. A system according to this aspect of the invention is eminently suitable for use in connection with character printing since the output indicative of print quality may be utilized for operating an error printer for example which may be visually monitored for the purpose of keeping a check on the quality of print reproduction. In this way various deviations from a predetermined standard of perfection may be observed and steps may be taken if necessary to improve the print quality before it becomes unacceptable.

An exemplary embodiment of the invention will now be described with reference to the accompanying drawings in which.

Figure 1:
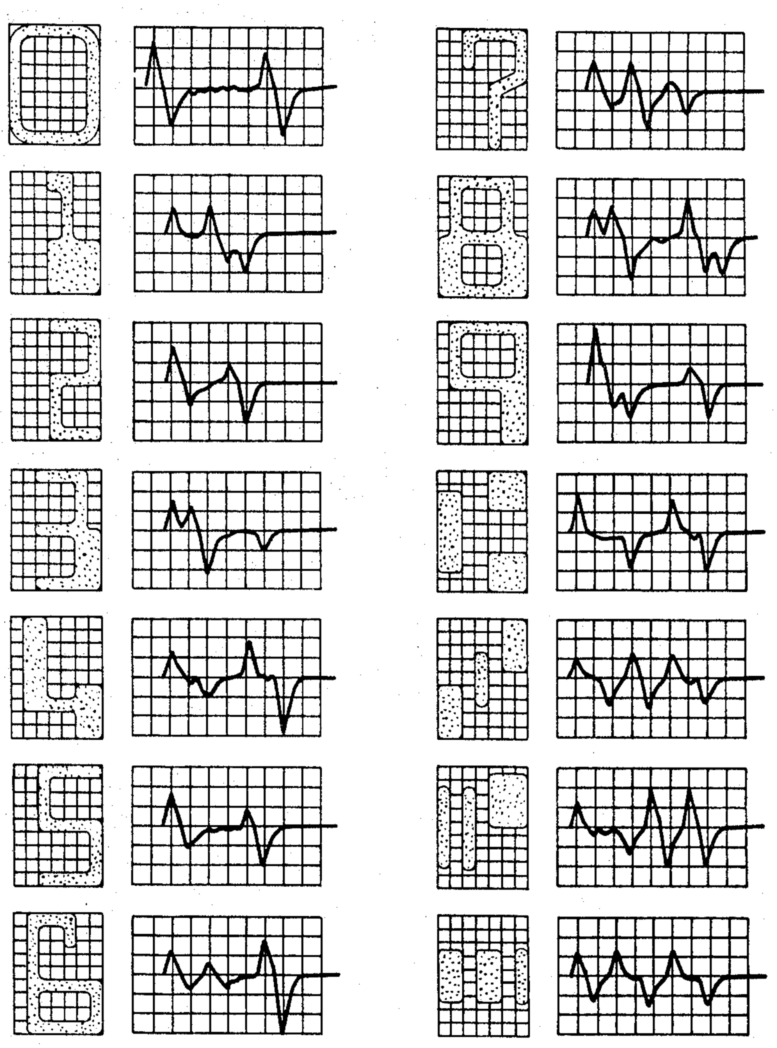
FIG. 1 is a waveform diagram of waveforms corresponding to E13B characters.
Figure 2:
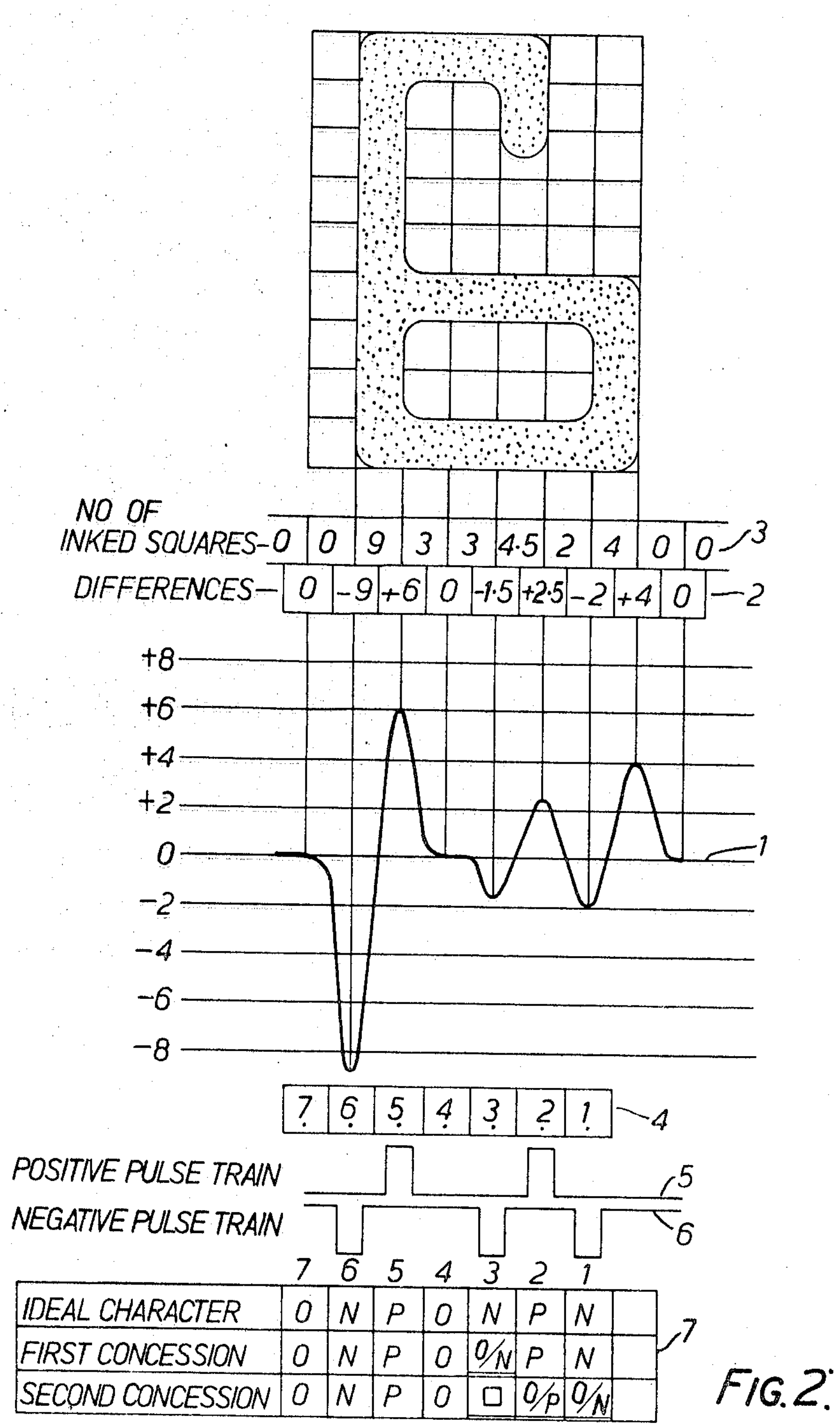
FIG. 2 is a diagram showing waveforms corresponding to a specific E13B character.

FIG. 1 shows fourteen E13B characters and their corresponding waveforms. These waveforms are produced by passing the characters, which are printed in magnetic ink, across a read head, after passing the print through a saturating magnetic field, which provides output pulses having a polarity and magnitude determined in accordance with flux changes corresponding to printed area changes at the head as a character is scanned. The right-hand side of the characters is the leading edge as regards movement of the character relative to the read head and corresponds to the left-hand side of the waveform shown. As a character is scanned, an increase in area produces a positive pulse of magnitude proportional to the area increase, and a decrease of area produces a negative pulse. Each character produces, when scanned, a unique waveform containing pulses of a particular spacing, sign and magnitude. Referring now to FIG. 2, E13B character 6 and its corresponding waveform will now be examined in detail. All E13B characters are constructed to fall within an imaginary matrix 9 units high and 7 units wide. The width of the character may be considered as comprising seven strips which are scanned sequentially from right to left of the character and the maximum change of area for any character must be 9 units. For example with E13B character 6 as shown in FIG. 2 there is an initial change from zero of 4 square units of area, then a negative change of 2 square units of area followed by an increase of 2½ square units of area, and so on as shown in table 2 until the character is completely scanned and the waveform 1 is built up.

A unique waveform may therefore be produced for each character consisting of pulses which vary in spacing and sign. Neglecting the pulse-magnitude variations, the sign and spacing of pulses affords in respect of any character sufficient information to distinguish it from any other character. The first pulse for each character may be neglected for identification purposes since it is always positive and therefore provides no distinctive information. Each character may thus be represented (neglecting the first pulse) by a 7 signal element square wave in which each element may be either a positive pulse, a negative-pulse or a zero or no-pulse condition. In FIG. 2 the signal elements are numbered 1 to 7 in the order in which they are scanned and the 7 signal-element square waves are represented by two square-wave pulse trains—a positive-pulse train 5 and a negative-pulse train 6. For E13B character 6 signal elements numbers 2 and 8 are positive and signal elements numbers 1, 3 and 6 are negative. By examining both pulse trains signal elements 4 and 7 will be seen to be zero since they are neither positive nor negative.

For each character, assuming it to be an ideal character, a unique pair of positive and negative pulse trains may be produced and by examining the waveforms of an unknown ideal character it is possible to recognize the character. In the table 7, shown below the negative pulse train in FIG. 2, the first line headed "Ideal character" shows the condition to be expected for elements 1 to 7 of an ideal character, in this example E13B character 6, where 0 is representative of zero, N is representative of negative and P is representative of a positive pulse condition. Referring to waveform 1, it has been found possible to give concessions for certain signal elements but nevertheless to retain sufficient information to recognize any character. For example element 3 in waveform 1, which is negative with an absolute value below a level 2 magnitude, may be recognized as "not positive" if it is either zero or negative. This concession is shown in the second line of table 7, wherein the condition for elements 3(underlined) is accorded an acceptance level of "zero or negative." This first concession condition is applied to waveforms other than the illustrated E13B character waveform 6, levels closer to zero than 2 for all characters being accorded a first concession recognition state. This principle is taken a stage further as shown in the r third line of table 7 head "Second concession" when the underlined elements 1 to 3 are each accorded alternative recognition states. At this concession level alternative recognition states are accorded in the waveform for all elements closer to zero than 3. It has been found that by allowing concessions for elements of each character which are closer to zero than 3 a unique pulse combination for each character is still possible. In line 3 of table 7, element 1 will be recognized as part of an E13B character 6 if it is zero or negative, element 2 will be recognized if it is zero or positive and the square symbol for element 3 indicates that it will be recognized whatever its state, or in other words ignored for identification purposes.

A pulse train representative of a particular character may be checked firstly to determine whether it contains signal elements corresponding to the second concession line of the table for each character i.e. maximum concession which must be satisfied if the character is to be recognized, secondly to confirm the presence of signal elements corresponding to a first quality condition, a thirdly to detect the presence of signal elements which correspond to a perfect or ideal character. It is therefore possible not only to recognize the character but to assess the print quality of the character.

For example a recognition signal may only be delivered, if when the pulse trains are examined for signal elements corresponding to a second concession but no recognition signal is obtained for the first concession or for the perfect character. In this example since no recognition signal is received for first-concession elements or for elements accorded to an ideal character although the character was recognized by the presence of elements in a second-concession recognition signal, a printing imperfection is indicated which it may be possible to rectify before the character becomes unrecognizable The recognition of a zero or no pulse condition outside a character presents no difficulty, for example element 7 of the E13B character 6 shown in FIG. 2 but zero or no pulse conditions inside a character do present something of a problem in that noise is generated which may be considered as comprising two parts. Firstly edge noise which is roughly proportionally the number of printed edges passing beneath the read head and secondly area noise which is roughly proportional to area and is caused by ink thickness variations, for example element 4 of E13B character 6 has 6 units of edge noise and 3 units of area noise. This noise is taken account of when recognizing zero conditions.

Figure 3:
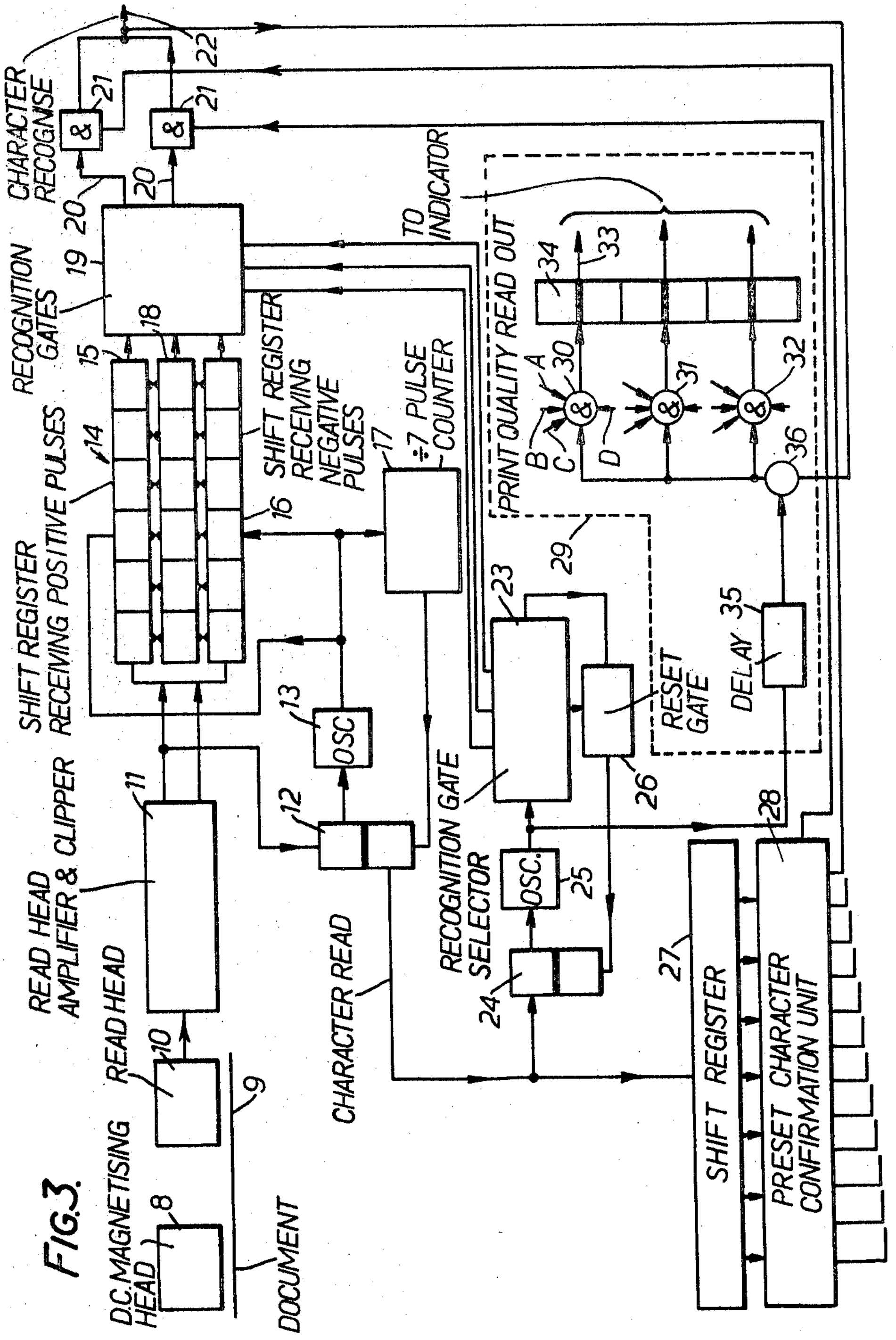
FIG. 3 is a block schematic diagram of apparatus for recognition and print-quality evaluation of E13B characters.

Turning now to FIG. 3 a block schematic diagram of apparatus for recognizing E13B characters printed in magnetic ink and for assessing their print quality comprises a magnetizing head 8 beneath which a document 9 bearing the E13B characters is passed, and a read head 10 following the magnetizing head 8, beneath which the magnetized characters are passed and which provides an AC waveform for each character corresponding (in the case of perfect characters) to the waveform shown for each character in FIG. 2. This waveform is applied to amplifier clipper 11 which converts positive and negative peaks of the AC waveform to represent "positive" and "negative" pulses which are separated to form two trains which respectively correspond to waveforms 5 and 6 respectively of FIG. 2. A first positive pulse in a pair of trains representative of a character passing beneath the read head, is applied to a bistable device 12 which triggers an oscillator 13 to commence feeding stepping pulses to shift-register apparatus 14. The shift register apparatus comprises a 7-bit register 15 for receiving pulses of the positive trains and a 7 bit shift register 15 for receiving the negative pulse train. The reciprocal of the oscillator frequency is 7 times the time period which a widest character (zero for example as shown in FIG. 1) takes to pass the read head 10. The pulse trains applied to the shift register are thereby divided into seven equal bits which are stored therein. The pulses delivered by the oscillator 13 are counted by pulse counter 17 which on the count of seven delivers an output to flip over the bistable device 12 thereby to inhibit the production of further pulses by the oscillator. A gating arrangement 18 which forms part of the shift register apparatus 14 is arranged to indicate the absence in each of the shift registers 15 and 16 of positive or negative pulses thereby to indicate in respect of each stored bit if a zero or no pulse output condition obtains. The shift register apparatus 14 thus contains seven bits each of which is set to be indicative of a positive or a negative or a no pulse condition.

The stored contents of shift register apparatus 14 is sampled by recognition gate 19 which delivers an output on a particular one of fourteen recognition wires 20 (only two of which are shown) each corresponding to a different one of the fourteen E13B characters, if selected signal elements are stored in the shift register apparatus which correspond to a particular character. The signal on a particular line 20 is applied to one of fourteen AND gates 21 (only two of which are shown) and each of which corresponding to a different character which if the signal is representative of an expected character has applied to it a further signal, the generation of which will be explained later, thereby causing a character recognition signal to be produced on recognition line 22. As hereinbefore described, each character is not only recognized but the quality of the character as regards print reproduction is also assessed and for this purpose the stored bits present in the shift register apparatus are checked sequentially for correspondence with three signal element combinations each representative of a different print quality. To facilitate sequential checking recognition gates 19 are sequentially set by recognition gate selector 23 in accordance with three combinations of signal elements.

As bistable 12 flips over in response to an output from counter 17 a character read signal is generated which turns over bistable device 24 to start oscillator 25. Pulses from the oscillator 25 are applied to recognition gate selector 23 which sets the recognition gate 19 sequentially to three states respectively representative of a second concession a first concession and an ideal character, a recognition signal being delivered in respect of each state in the presence of correspondence between that state and the stored digital signal. When the recognition gate selector 23 has completed its recognition gate-setting sequence it is arranged to provide an output to reset gate 25 which cooperates to trigger bistable device 24 and so stop the oscillator 25. The character read signal applied from bistable gate 12 when the shift register has received all information in respect of a character is applied to shift register 27 which includes one bit for each character in a particular combination of characters, each bit being associated with a preset character confirmation unit 28 which is preset in respect of each character to deliver an output signal to a particular one of the AND gates 21 according to which kind of character is expected. For example if the first character of a combination is expected to be E13B character 6, the first character read signal is arranged to trigger shift register 17 which causes an output from preset character confirmation unit 28 to be applied to the particularly one of the AND gates 21 which is representative of the E13B character 6. If then to this particular AND gate there is also applied on line 20 a recognition signal then an output is delivered on line 22 which indicates that an expected character has been recognized. In order to provide in respect of each recognized character an indication of print quality, print quality readout apparatus shown in dotted box 20 is provided. Gates 30, 31 and 32 are each interconnected with the recognition gate selector 23 by terminals A, B, C and D which by way of example are shown only on gate 30, but which are also provided on gate 31 and gate 32. Conveniently gate 30 is connected so as to provide an output when a second concession recognition state obtains and for this purpose connections A, B, C and D are appropriately connected to the recognition gate selector which when in a second concession recognition state provides signals to gate 30. If a recognition signal obtains in line 22 an output from at gate 30 will be applied on line 33 to a printer (not shown) by bistable gating arrangement 34 when an oscillator pulse applied to set the recognition gate selector 23 into a second concession recognition state has passed delay line 36 and is applied to AND gate 36 to which the recognition signal is also applied This delay is necessary in order to allow time for the recognition gate selector to operate and to allow time for a character recognition signal to appear on line 22. Gates 31 and 32 may be similarly operated to indicate respectively a first concession recognition state and an ideal character recognition state.

If a character can only be read in a maximum or in this example second concession recognition state then obviously the printer may be need attention to improve the print quality.

Although this particular E13B character print recognition system includes shift register 27 and preset character confirmation unit 28 it will be appreciated that if information concerning an expected character is not available a character may still be recognized without it utilizing these parts which only serve to confirm that the particular character recognized is expected. It will also be appreciated that it may not necessarily be desirable to provide an indication of print quality but merely to recognize the character and in this instance the recognition gate 19 would be set to a maximum concession whereby even a relatively poorly reproduced character could be recognized. We claim:

1. A character recognition system for recognizing printed characters comprising a read head, means for producing relative movement between said head and a printed character to provide an AC output signal characteristic of the character, amplifier/clipper means to which said AC output signal is applied to produce a corresponding three level digital signal including positive and negative pulses corresponding to positive and negative peaks in the AC output signal, two shift registers through which said digital signal is stepped positive pulses to one of said two registers and negative pulses to the other of said two shift registers, gating means operatively associated with said two shift registers and responsive to the absence of signals in corresponding stages of said two shift registers for registering a zero signal level state obtaining in said digital signal, recognition gates operatively associated with the gating means and the two shift registers for sampling the signal stored therein and providing an appropriate output signal when correspondence obtains between the stored signals and signals characteristic of a printed character represented by the state of said recognition gates, recognition gate selector means operative for setting sequentially the recognition gates in accordance with different combinations of signal elements, each combination being representative (in respect of the character to be recognized) of a different print quality, and coincidence gate means responsive, to signals indicative of the recognized character and to signals characteristic of the particular signal combination utilized in respect of that character, for providing an output signal indicative of print quality in respect of a recognized character.

2. A character recognition system as claimed in claim 1 for recognizing characters printed in magnetic ink wherein the read head is responsive to the change of magnetic ink area scanned for producing the AC output signal.

3. A character recognition system as claimed in claim 2 adapted for the recognition of magnetic ink printed E13B characters on checks.